(12) United States Patent
Huang et al.

(10) Patent No.: US 9,166,434 B2
(45) Date of Patent: Oct. 20, 2015

(54) UNIVERSAL CHARGER

(75) Inventors: Lilly Huang, Portland, OR (US);
Krishnan Ravichandran, Saratoga, CA (US); Wayne L. Proefrock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 13/538,265

(22) Filed: Jun. 29, 2012

(65) Prior Publication Data
US 2014/0001849 A1 Jan. 2, 2014

(51) Int. Cl.
*H02J 7/00* (2006.01)
*H02J 7/14* (2006.01)
*H02J 7/35* (2006.01)

(52) U.S. Cl.
CPC ............. *H02J 7/0055* (2013.01); *H02J 7/0065* (2013.01); *H02J 7/35* (2013.01); *Y10T 307/352* (2015.04); *Y10T 307/406* (2015.04)

(58) Field of Classification Search
CPC ...... H02J 7/0065; H02J 7/35; Y02T 307/406; Y02T 307/352
USPC ................... 320/101, 123, 128, 138
See application file for complete search history.

(56) References Cited

U.S. PATENT DOCUMENTS

| | | | |
|---|---|---|---|
| 5,548,200 A | | 8/1996 | Nor et al. |
| 5,640,076 A * | | 6/1997 | Youn .............................. 320/138 |
| 6,222,370 B1 * | | 4/2001 | Schousek et al. ............. 324/436 |
| 6,271,643 B1 | | 8/2001 | Becker et al. |
| 6,392,384 B1 * | | 5/2002 | Hwang Bo et al. ........... 320/116 |
| 6,448,742 B1 * | | 9/2002 | Waterman et al. ............. 320/114 |
| 7,023,180 B2 * | | 4/2006 | Nagai et al. .................... 320/162 |
| 7,030,517 B2 | | 4/2006 | Hansmann et al. ........... 307/150 |
| 7,425,815 B2 * | | 9/2008 | Wong et al. .................... 320/141 |
| 7,432,685 B2 * | | 10/2008 | Hayashi ........................ 320/128 |
| 7,446,434 B1 * | | 11/2008 | Simmons et al. ............... 307/75 |
| 7,498,769 B1 | | 3/2009 | Potanin et al. |
| 7,514,900 B2 * | | 4/2009 | Sander et al. .................. 320/101 |
| 7,535,122 B2 | | 5/2009 | Visairo-Cruz et al. |
| 7,560,829 B2 * | | 7/2009 | Proefrock et al. ............... 307/18 |
| 7,573,235 B2 | | 8/2009 | Hand |
| 7,615,965 B2 * | | 11/2009 | Popescu-Stanesti et al. .. 320/128 |
| 7,622,898 B2 * | | 11/2009 | Shimizu et al. ................ 320/166 |
| 7,698,575 B2 | | 4/2010 | Samson |
| 7,759,906 B2 * | | 7/2010 | Ferguson ....................... 320/164 |
| 7,790,307 B2 * | | 9/2010 | Kim ............................... 429/122 |
| 7,870,916 B2 | | 1/2011 | Carter |
| 7,893,657 B2 * | | 2/2011 | Chavakula ..................... 320/138 |
| 8,120,312 B2 | | 2/2012 | Bucur et al. |
| 8,174,313 B2 | | 5/2012 | Vice |

(Continued)

OTHER PUBLICATIONS

U.S. Appl. No. 13/728,227, filed Dec. 27, 2012, Huang et al.
(Continued)

*Primary Examiner* — Helen Rossoshek
(74) *Attorney, Agent, or Firm* — KED & Associates LLP

(57) ABSTRACT

A charging apparatus may be provided that includes a first charger part and a second charger part. The first charger part to receive first power from a first power source and second power from a second power source. The first charger part to determine a type of the second power source and to provide a first output power based on the determined type of the second power source. The second charger part to receive the first output power from the first charger part and to provide power to a load and/or a battery.

20 Claims, 4 Drawing Sheets

(56) References Cited

U.S. PATENT DOCUMENTS

| | | | |
|---|---|---|---|
| 8,242,742 B2* | 8/2012 | Kao et al. | 320/114 |
| 8,339,105 B2* | 12/2012 | Maleyran et al. | 320/138 |
| 8,368,345 B2* | 2/2013 | Wahlqvist et al. | 320/101 |
| 8,400,162 B1* | 3/2013 | Jannson et al. | 324/427 |
| 8,450,980 B2* | 5/2013 | Kumar et al. | 320/138 |
| 8,482,260 B2* | 7/2013 | Hsieh et al. | 320/138 |
| 8,581,550 B2* | 11/2013 | Lin et al. | 320/123 |
| 8,587,251 B2* | 11/2013 | Nakashima et al. | 320/101 |
| 8,773,077 B1 | 7/2014 | Elmes et al. | |
| 8,903,456 B2 | 12/2014 | Chu et al. | |
| 2001/0034807 A1 | 10/2001 | Takaoka et al. | |
| 2003/0057920 A1 | 3/2003 | Dotzler | |
| 2005/0141154 A1 | 6/2005 | Consadori et al. | |
| 2006/0256989 A1 | 11/2006 | Olsen et al. | |
| 2009/0128086 A1 | 5/2009 | Lee | |
| 2009/0212222 A1* | 8/2009 | Kito et al. | 250/361 R |
| 2011/0029703 A1 | 2/2011 | Huo et al. | |
| 2011/0062913 A1* | 3/2011 | Lin et al. | 320/101 |
| 2011/0109261 A1* | 5/2011 | Chavakula | 320/101 |
| 2011/0133700 A1 | 6/2011 | Martin et al. | |
| 2011/0138197 A1 | 6/2011 | Lakshmanan et al. | |
| 2012/0021807 A1 | 1/2012 | Book et al. | |
| 2012/0091968 A1* | 4/2012 | Heo et al. | 320/138 |
| 2012/0098350 A1 | 4/2012 | Campanella et al. | |
| 2012/0176078 A1 | 7/2012 | English et al. | |
| 2012/0187897 A1* | 7/2012 | Lenk et al. | 320/101 |
| 2012/0197341 A1 | 8/2012 | Cowley et al. | |
| 2012/0280648 A1* | 11/2012 | Hwang et al. | 320/108 |
| 2013/0290743 A1 | 10/2013 | Lee et al. | 713/300 |
| 2014/0001849 A1 | 1/2014 | Huang et al. | |
| 2014/0056041 A1 | 2/2014 | Zhu et al. | |
| 2014/0062395 A1 | 3/2014 | Kwon et al. | |
| 2014/0184160 A1* | 7/2014 | Huang et al. | 320/114 |

OTHER PUBLICATIONS

U.S. Appl. No. 13/730,561, filed Dec. 28, 2012, Huang et al.
U.S. Appl. No. 13/728,268, filed Dec. 27, 2012, Proefrock et al.
U.S. Office Action issued in co-pending U.S. Appl. No. 13/728,227 dated Dec. 18, 2014.
U.S. Office Action for U.S. Appl. No. 13/730,561 dated Feb. 9, 2015.
U.S. Office Action for U.S. Appl. No. 13/728,268 dated Jun. 29, 2015.
U.S. Office Action for U.S. Appl. No. 13/728,227 dated Jul. 8, 2015.
U.S. Notice of Allowance for U.S. Appl. No. 13/730,561 dated Jul. 22, 2015.

* cited by examiner

UNIVERSAL CHARGER

BACKGROUND

1. Field

Embodiments may relate to a charger for alternative energy sources (or alternative power sources).

2. Background

There is a desire to extend battery life and/or to create new usage models by applying alternative energy (or alternative power). However, mobile devices (such as tablets and phones) may be very slow and limited in their use of alternative energy.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
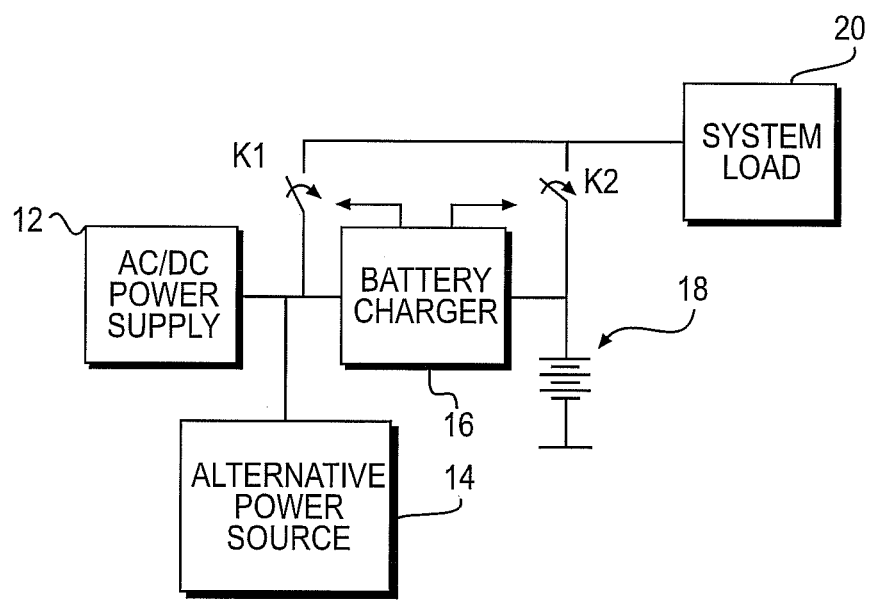
FIG. 1 shows a charging system according to an example arrangement.

In the following detailed description, like reference numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

FIG. 1 shows a charging system according to an example arrangement. Other arrangements may also be provided.

More specifically, FIG. 1 shows a charging system that includes components to charge a battery 18 and/or to be supplied to a system load 20 (or platform load). The charging system may include a battery charger 16 to receive power from an alternate current/direct current (AC/DC) power supply 12. The AC/DC power supply 12 may include an AC/DC adaptor to convert AC power into DC power. The battery charger 16 may also receive power from an alternative power source 14 (or alternative energy source).

FIG. 1 also shows switches K1 and K2 connected to the battery charger 16. When there is sufficient power from an AC/DC adaptor input, then the switch K1 may be turned ON. This may power up the system load. If the load power is below a power capacity of the input power, then the battery 18 may be charged (assuming that the battery 18 has not reached 100% battery capacity) with the switch K2 ON. Otherwise, the switch K2 may remain OFF under this mode of operation. When the AC/DC adaptor is removed from the input, or in an example in which it is connected but with the power capacity below a threshold, then the switch K1 is disabled (OFF) and the switch K2 is enabled (ON). In such an example, the battery 18 is discharged and the load may be powered up.

The alternative power source 14 may be any one of a solar energy source, a mechanical energy source (such as via wind), a photovoltaic energy source, a thermal energy source, a radio frequency (RF) energy source, a vibration energy source, a fuel cell or any other power source except a power source from an AC grid.

The charging system may operate such that only one power source (or energy source) may be electrically coupled to the battery charger 16 at a time. Therefore, a user may need to know the power source and provide a proper interface or adaptor to the battery charger 16 so that a charging may take place and/or the system load 20 may be powered up by the source.

The charging system may be provided in any of a number of electronic devices including a mobile terminal, a mobile device, a mobile computing platform, a laptop computer, a tablet, an ultra-mobile personal computer, a mobile Internet device, a smartphone, a personal digital assistant, etc.

The battery charger 16 may be designed to only effectively handle a power supply input from the AC/DC power supply 12 by using an AC/DC adaptor. The AC/DC adaptor may have characteristics of an ideal voltage source with a relatively fixed voltage output regardless of current that is being drawn by a load, such as the battery 18 and/or the load 20.

The battery charger 16 may not function properly or may even shut down when connected to the alternative power sources 14 (or alternative energy sources). This may be because voltage, current and/or total available energy from the alternative power source 14 (or power and/or voltage from an energy harvester) may vary dynamically as well as change in a broad range. For example, an output voltage of solar panels may range from 0 volts to greater than 20 volts depending on a current of a load and/or strength of solar irradiation at a particular day/time of application. This voltage difference may differ from an AC/DC adaptor that provides a fixed 12 volts or 19 volts when power is obtained from an AC/DC power supply 12.

In at least one arrangement, a separate charger (or adaptor) may be provided to meet specific requirements for each of the power sources. For example, one battery charger may be provided for an AC/DC adaptor (and the AC/DC power supply 12) and a different battery charger may be provided for a photovoltaic harvested energy source. The charging system may include multiple battery chargers (ICs), if the system wants to absorb energy from alternative power sources.

In an arrangement with multiple battery chargers (each for a different power source), only one of the chargers may operate at any time and the other two or more chargers may be idle at that time. This may not be a cost-effective solution where duplicated functions exist. A multiple battery charger system may also not be practical due to space constraints and/or form factor requirements, such as in a tablet or a smart phone.

Another technique may be to make an alternative power source function like a DC adaptor. For example, a solar panel unit may include a storage element (e.g. battery) as well as a DC-DC regulator to output a fixed DC voltage (e.g. 19 volts) so that the solar panel unit (including all additional power conditional circuitry and power storage parts) may be directly connected to a DC input of the electronic device that includes a charging system.

Figure 2:
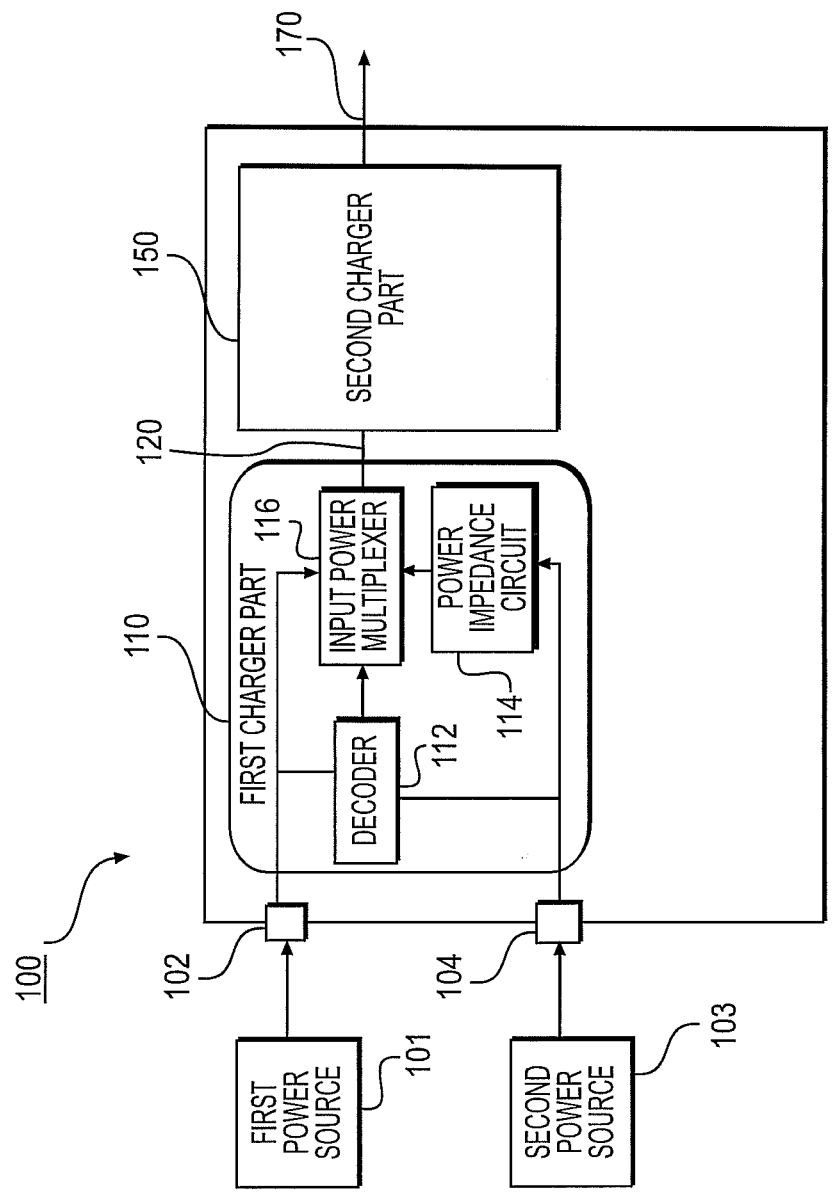
FIG. 2 shows a charging apparatus according to an example embodiment.

FIG. 2 shows a charging apparatus (or universal charger) according to an example embodiment. Other embodiments and configurations may also be provided.

More specifically, FIG. 2 shows a charging apparatus 100 (or charging system) that includes a first charger part 110 and a second charger part 120. The first charger part 110 may receive power from a single power source and/or from a plurality of power sources. The first charger part 110 may operate to determine (or sense) a type of the power source (or energy source) provided from at least one power source.

If an alternative power source is provided to the charging apparatus 100, then adjustments may be made to stabilize the received power.

An output power 120 may be provided from the first charger part 110 to the second charger part 150. The second charger part 150 may function as a battery charger to provide a proper voltage for the specific load and/or battery. The second charger part 150 may provide an output power 170 to a load and/or a battery.

As shown in FIG. 2, the first charger part 110 may include a decoder 112, a power impedance circuit 114 (or power impedance unit) and an input power multiplexer 116. Although the following description describes the input power multiplexer 116, the described operations may be provided by any circuit that can provide an output power.

The charging apparatus 100 may include a first port 102 to receive a first power source 101. In this example, the first power source 101 may be from an AC/DC adaptor. The charging apparatus 100 may also include a second port 104 to receive a second power source 103. The second power source 103 may be an alternative power source (or alternative energy source), such as any one of a solar energy source, a mechanical energy source (such as wind), a photovoltaic energy source, a thermal energy source, a radio frequency (RF) energy source, a vibration energy source, a fuel cell or any other power source except a power source from an AC grid.

Power from the first power source 101 may be input to the charging apparatus 100 via the first port 102, and the power may be provided to the decoder 112 and to the input power multiplexer 116.

Power from the second power source 101 may be input to the charging apparatus 100 via the second port 104, and the power may be provided to the decoder 112 and to the power impedance circuit 114.

The decoder 112 may receive any number of powers from the inputted power. The decoder 112 may determine (or sense) a type of power source being provided based on different properties of the received power. For example, the decoder 112 may determine (or sense) the type of power source based on voltage and/or current of the received power. The decoder 112 may also determine the type of power source based on identification information such as impedance or current-voltage (I-V) characteristics provided or inherent with the received power.

The decoder 112 may include a look-up table and/or firmware in order to determine (or sense) the received power source.

The decoder 112 may provide an output signal to the input power multiplexer 116. The output signal may identify which input (or channel) to the input power multiplexer 116 should be output to the second charger part 150.

The received power from the second power source 103 may be provided to the power impedance circuit 114. As one example, the power impedance circuit 114 may include switches and/or resistors. The power impedance circuit 114 may provide impedance matching so that a proper output power is provided. This may be provided by adjusting resistance so as to get a maximum power source.

One example of impedance matching may be achieved with a maximum power point tracking algorithm based on a duty cycle auto-adjustment under a DC/DC power conversion circuit. This may involve adjusting the reflected or equivalent impedance at an output of a harvester, under any actual loading condition, in order to match to a desired impedance of the harvester output, and therefore enable the maximum power output to be delivered from a source to a load.

The output from the power impedance circuit 114 may be provided to an input of the input power multiplexer 116.

Based on the signal received from the decoder 112, the input power multiplexer 116 may output (or select) one of the received powers, such as the power received from the first power source 101 or power corresponding to the power received from the second power source 103. The input power multiplexer 116 may provide the output power 120 based on the signal received from the decoder 112.

The first charger part 110 may be a power processing and/or power conditioning unit.

The second charger part 150 may receive the output power 120 from the first charger part 110. The second charger part 150 may determine and control a power path and/or power partitioning such that the output power 170 is provided at a proper or desired power partitioning control and battery charging or discharging.

The second charger part 150 may function like a battery charger. The second charger part 150 may provide power (or energy) to a rechargeable battery by applying an electrical current. The second charger part 150 may have temperature and/or voltage/current sensing circuits. The second charger part 150 may also have a controller to adjust the charging current and/or to cut off the current and end the charging process.

The second charger part 150 may be considered a smart battery charger that can respond to conditions of the battery, and modify its charging actions accordingly.

The charging apparatus 100 may be called a universal charger since the charging apparatus 100 may provide power from any of a number of power sources. The universal charger may include the first charger part 110 (or front stage) acting as a power source manager and the second charger part 150 (or back stage) acting as a battery charger. The universal charger may take power from different types or forms of power sources, either from a DC supply (from an AC/DC adaptor) or from an alternative power source (or harvested energy source). If input power is from one of the alternative power sources (or alternative energy source), energy drawn from the alternative power source may be maximized and the output power 120 may be provided at a desired voltage level or range. The charging apparatus 100 may then perform battery charging by using the second charger part 150 (or battery charger) and/or power up a load by using the second charger part 150 (or battery charger). These operations may be executed seamlessly or "behind the scene," regardless of whether the power source is a DC power supply (such as from an AC/DC adaptor) or a current source with a wide range of variable voltage input, such as photovoltaic (PV) panel.

The charging apparatus 100 may take input power from multiple energy sources, which may have different or distinguishable characteristics. An output of the charging apparatus 100 may be fed into a battery pack and/or a system load.

The first charger part 110 may manage the power source(s) to achieve optimal or maximum energy from one or more input power sources. The first charger part 110 may properly select and output/link the first charger part 110 to the second charger part 150. The second charger part 150 may be a battery charger with intelligence to take advantage or maximize benefits due to alternative energy, for example, energy adaptive system-load power management.

The first charger part 110 may include the decoder 112, the power impedance circuit 114 (e.g. impedance matching circuitry) and the input power multiplexer 116.

The decoder 112 may include a look-up table and/or an analog/digital comparator to identify a power source input. The output of the decoder 112 may control or select a channel of the input power multiplexer 116. The input power multiplexer 116 may be a logic-selected switch. The input power multiplexer 116 may output power from either an AC/DC adaptor or an alternative power source (or alternative energy source) based on a pre-defined logic table (e.g. the decoder 112) or an on-the-fly-comment from a programmable interface of source power management. The information may be stored in a buffer register and may be updated.

The power impedance circuit 114 (or power impedance tuning device) may address concerns associated with alternative power sources, namely variable power and/or unstable voltage output. The power impedance circuit 114 may include impedance matching circuitry, on-the-fly power tracking control and tuning algorithm and/or other associated logic circuitry. The power impedance circuit 114 may also consider environmental changes such as irradiation gradient for PV energy harvesting. As one example, maximum power point tracking (MPPT) techniques may be provided for solar energy harvesting.

The first charger part 110 may operate almost independently from the second charger part 150, which is the charging control and power output. Therefore, the charging apparatus 100 may easily deal with flexibility or complexity of alternative energy.

For a user of mobile devices, such as a phone or a tablet, a user may plug-in any power source without compatibility concerns or even dysfunction due to unstable or variable power supply (in the case of harvested energy) or other alternative power sources.

The charging apparatus 100 may connect to any energy source, may power a system load and/or charge a battery, and/or provide a plug-and-play model.

Figure 3:
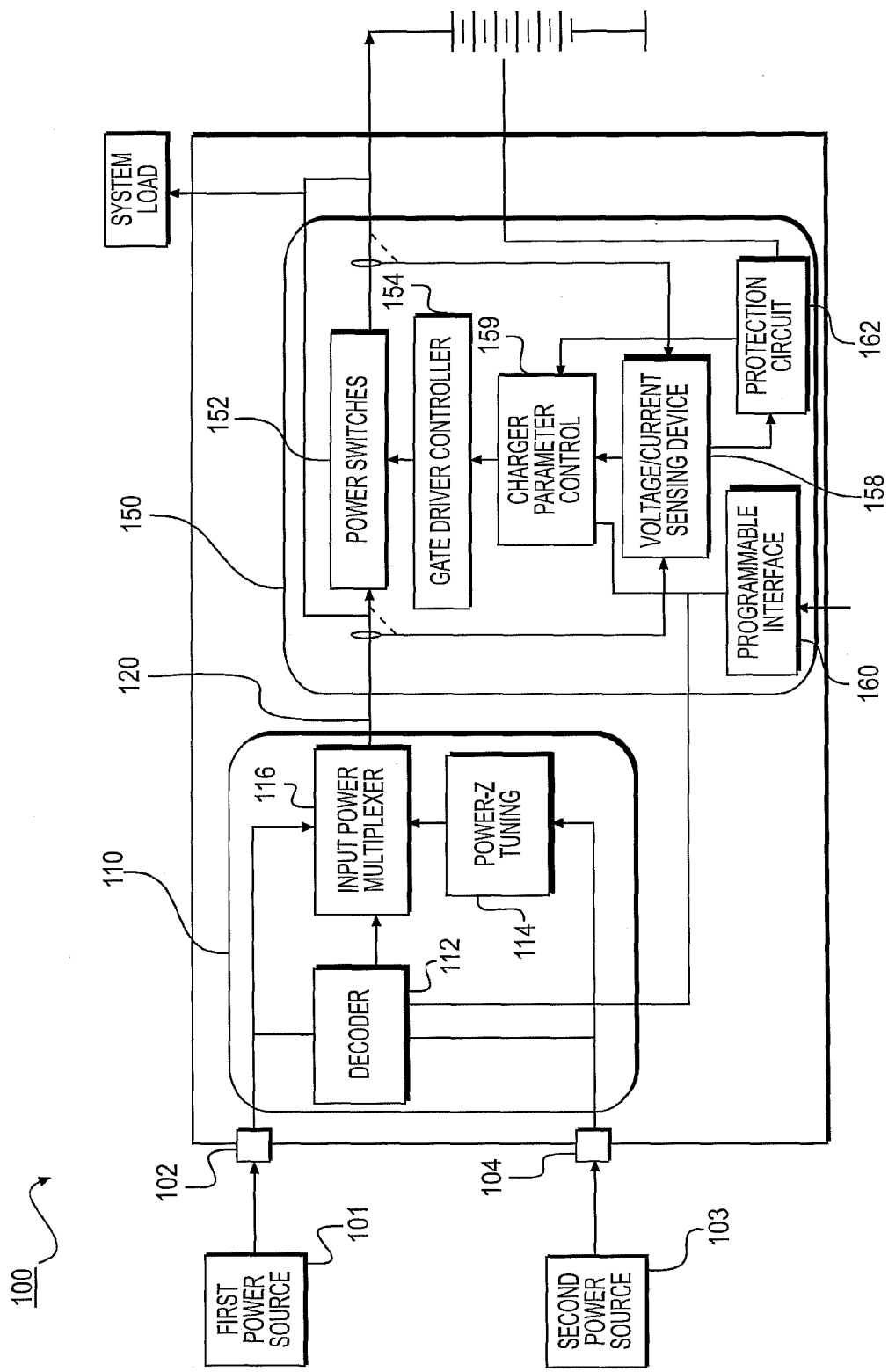
FIG. 3 shows a charging apparatus that includes a battery charger according to an example embodiment.

FIG. 3 shows a charging apparatus that includes a battery charger according to an example embodiment. Other embodiments and configurations may also be provided.

For ease of discussion, various components of the charging apparatus 100 discussed above will not be further discussed.

FIG. 3 shows that the second charger part 150 includes various components such as power switches 152, a gate driver controller 154, a charger parameter control 156, a voltage/current sensing device 158, a programmable interface 160 and a protection circuit 162.

The output power 120 from the first charger part 110 may be received at the second charger part 150. The power switches 152 may be controlled by the other components to appropriately direct the received power to a desired power consumption unit such as a system load and/or a battery. Switches may be provided to route the power to either the system load or the battery (or battery pack).

The programmable interface 160 (I2c) may be provided so that a user may input control information. This information may be provided back to the decoder 112 of the first charger part 110.

The voltage/current sensing device 158 may sense the current and/or the voltage of the power to be output from the second charger part 150. The voltage/current sensing device 158 may be coupled to various nodes at the power switches 152.

An output of the voltage/current sensing device 158 may provide an output to the charger parameter control 156, which may then provide an output to the gate driver controller 154. The gate driver controller 154 may thereafter control the power switches 152 and adjust the output power accordingly.

The protection circuit 162 may also be coupled to the battery to sense a temperature of the battery. The protection circuit 162 may provide an output signal to the charger parameter control 156 so as to adjust the power when a sensed temperature is too high.

Figure 4:
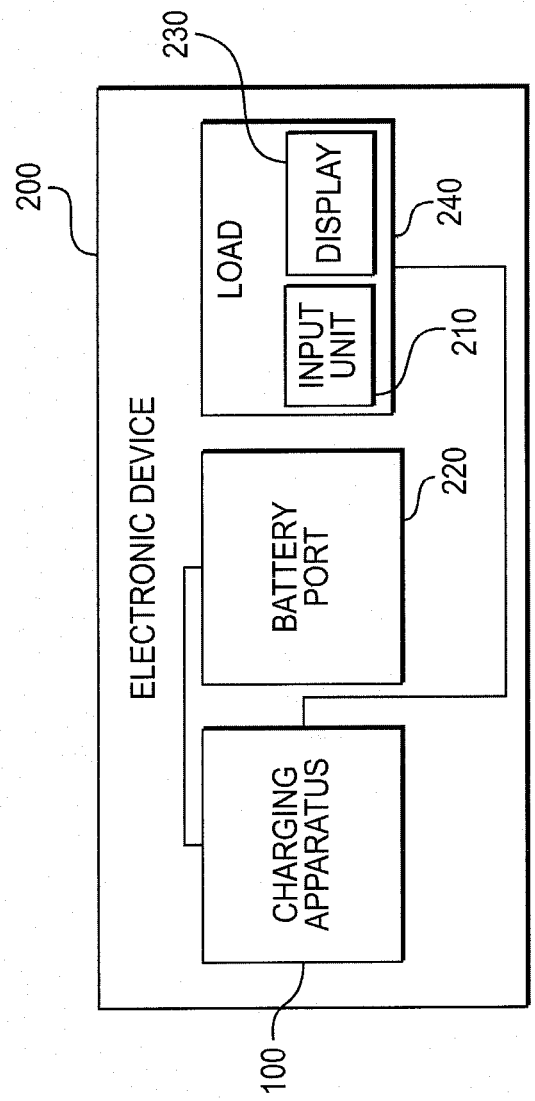
FIG. 4 shows an electronic device according to an example embodiment.

FIG. 4 shows an electronic device according to an example embodiment. Other embodiments and configurations may also be provided.

More specifically, FIG. 4 shows an electronic device 200 such as a mobile terminal, a mobile device, a mobile computing platform, a laptop computer, a tablet, an ultra-mobile personal computer, a mobile Internet device, a smartphone, a personal digital assistant, etc.

As shown, the electronic device 200 may include the charging apparatus 100, a battery port 220, and a load 240. The load 240 may include an input unit 210 and a display 230, for example. The input unit 210 may be a keyboard, a touch screen, a button, etc. that allows a user to provide an input. The battery port 220 may receive a battery that may be charged or used to power the electronic device 200.

The charging apparatus 110 may provide power to the battery and/or provide power to the load 240 (such as a system load or a platform load). The load may be any of a number of electronic components within the electronic device 200.

The input unit 210 may be an interface between an alternative power source and the device (or platform) to be powered. The input unit 210 may allow the user to input a command or instruction to input or accept power from any power source regardless of types, values or characteristics of the power source.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus comprising:
    a first charger part to receive first power from a first power source and second power from a second power source, the first power source is from an alternate current/direct current (AC/DC) adaptor, and the first charger part includes:
        a decoder to receive the first power from the first power source, to receive the second power from the second power source, to determine a specific type of the second power source, and to provide an output signal based on the determined specific type of the second power source, and
        a circuit to receive, at a first input, first power from the first power source, to receive, at a second input, power corresponding to the second power, and to receive the output signal from the decoder, the circuit to select power from one of the first input or the second input of the circuit based on the output signal, and the circuit to output first output power based on the selected power; and a second charger part to receive the first output power from the first charger part and to provide a second output power.

2. The apparatus of claim 1, wherein the second power source is one of a solar power source, a mechanical power source, a photovoltaic power source, a thermal power source, a radio frequency power source, a vibration power source or a fuel cell.

3. The apparatus of claim 1, wherein the first charger part further includes a power impedance circuit to receive the second power from the second power source.

4. The apparatus of claim 3, wherein the power impedance circuit to adjust impedance of the second power from the second power source, and to provide the adjusted power to the circuit.

5. The apparatus of claim 4, wherein the power impedance circuit to adjust a resistance to increase stability of the second power to provide to the circuit.

6. The apparatus of claim 1, wherein the decoder is to include a look-up table to identify a power source input.

7. The apparatus of claim 1, wherein the first charger part includes a first port to receive the first power source and a second port to receive the second power source.

8. The apparatus of claim 1, wherein the second charger part to provide the second output power to a battery or to a system load.

9. The apparatus of claim 1, wherein the circuit is a multiplexer having the first input and the second input.

10. A charging apparatus comprising:
a first input port to receive first power from a first power source;
a second input port to receive second power from a second power source;
a decoder to receive the first power from the first power source, to receive the second power from the second power source and to determine a specific type of the received second power source, and the decoder to provide an output based on the determined specific type of the second power source;
a circuit to receive the first power at a first input, the second power at a second input and the output from the decoder, and the circuit to select power from one of the first input or the second input based on the output from the decoder, the circuit to provide a power based on the selected power, and the circuit is a multiplexer having the first input and the second input; and
a battery charger to receive the power from the circuit and to provide an output power.

11. The charging apparatus of claim 10, further comprising a power impedance circuit to receive the second power from the second power source.

12. The charging apparatus of claim 11, wherein the power impedance circuit to adjust impedance of the power from the second power source, and to provide the adjusted power to the circuit.

13. The charging apparatus of claim 12, wherein the power impedance circuit to adjust a resistance to increase stability of the second power to provide to the circuit.

14. The charging apparatus of claim 10, wherein the decoder is to include a look-up table to identify a power source input.

15. The charging apparatus of claim 10, wherein the battery charger to provide the output power to a battery or to a system load.

16. The charging apparatus of claim 10, wherein the second power source is one of a solar power source, a mechanical power source, a photovoltaic power source, a thermal power source, a radio frequency power source, a vibration power source, or a fuel cell.

17. The apparatus of claim 10, wherein the first power source is from an alternate current/direct current (AC/DC) adaptor.

18. An electronic device comprising:
a battery port to receive a battery; and
a charging apparatus to provide power to the battery or to provide power to a load, the charging apparatus including:
a decoder to receive first power from a first power source, to receive second power from a second power source and to determine a specific type of the received second power source, and the decoder to provide an output based on the determined specific type of the second power source,
a circuit to receive the first power, to receive power corresponding to the second power and to receive the output from the decoder, and the circuit to select the first power or the second power based on the output from the decoder, the circuit to provide a power based on the selected power, and the circuit is a multiplexer having the first input and the second input, and
a battery charger to receive the power from the circuit and to provide an output power to the battery or the load.

19. The electronic device of claim 18, further comprising a power impedance circuit to receive power from the second power source, to adjust impedance of the power from the second power source, and to provide the adjusted power to the circuit.

20. The electronic device of claim 18, wherein the power impedance circuit to adjust a resistance to increase stability of the power to provide to the circuit.

* * * * *